(12) United States Patent
Zhang et al.

(10) Patent No.: US 12,540,022 B2
(45) Date of Patent: Feb. 3, 2026

(54) PROTECTIVE APPARATUS AND TRANSPORT APPARATUS

(71) Applicant: CONTEMPORARY AMPEREX TECHNOLOGY (HONG KONG) LIMITED, Hong Kong (CN)

(72) Inventors: Lei Zhang, Ningde (CN); Xiong He, Ningde (CN); Jun Ming, Ningde (CN); Tao Du, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 12 days.

(21) Appl. No.: 18/471,975

(22) Filed: Sep. 21, 2023

(65) Prior Publication Data

US 2024/0010411 A1  Jan. 11, 2024

Related U.S. Application Data

(63) Continuation of application No. PCT/CN2021/142511, filed on Dec. 29, 2021.

(51) Int. Cl.
*B65D 81/07* (2006.01)
*B65D 25/10* (2006.01)
(Continued)

(52) U.S. Cl.
CPC ........... *B65D 81/07* (2013.01); *B65D 25/108* (2013.01); *B65D 43/0202* (2013.01);
(Continued)

(58) Field of Classification Search
CPC .. B65D 81/07; B65D 25/108; B65D 43/0202; B65D 85/20; B65D 85/30; B65D 2543/00361; B65D 85/672
(Continued)

(56) References Cited

U.S. PATENT DOCUMENTS 4,402,483 A * 9/1983 Kurabayashi ........... E02D 27/34
  52/167.9
6,899,226 B2 * 5/2005 Voissem ................. B65D 85/66
  211/85.5
(Continued)

FOREIGN PATENT DOCUMENTS

CN  107591506 A  1/2018
CN  210852570 U  6/2020
(Continued)

OTHER PUBLICATIONS

The World Intellectual Property Organization (WIPO) International Search Report and Written Opinion for PCT/CN2021/142511 Oct. 10, 2022 13 Pages (including translation).
(Continued)

*Primary Examiner* — Orlando E Aviles
*Assistant Examiner* — Jenine Pagan
(74) *Attorney, Agent, or Firm* — ANOVA LAW GROUP, PLLC

(57) ABSTRACT

A protective apparatus configured to protect electrode plates includes a support assembly configured to support a roll around which the electrode plates are wound, and a damping assembly. A top of the damping assembly is fixed to a bottom of the support assembly, and a bottom of the damping assembly is configured to be fixed to a base plate of a transport apparatus.

17 Claims, 9 Drawing Sheets

(51) Int. Cl.
*B65D 43/02* (2006.01)
*B65D 85/20* (2006.01)
*B65D 85/30* (2006.01)

(52) U.S. Cl.
CPC ............ *B65D 85/20* (2013.01); *B65D 85/30* (2013.01); *B65D 2543/00361* (2013.01)

(58) Field of Classification Search
USPC .......... 206/53, 415, 389, 521, 583; 248/636
See application file for complete search history.

(56) References Cited

U.S. PATENT DOCUMENTS

| 7,325,691 | B2* | 2/2008 | Siy ................... | B65D 19/02 |
| | | | | 206/600 |
| 8,795,863 | B2* | 8/2014 | Naruse ............... | H01M 10/482 |
| | | | | 206/703 |
| 2007/0131574 | A1* | 6/2007 | Aoki ................. | B65D 81/052 |
| | | | | 206/521 |
| 2013/0068918 | A1* | 3/2013 | Mulder ............... | F16F 15/08 |
| | | | | 248/570 |
| 2014/0061422 | A1* | 3/2014 | Monteil .............. | F16F 15/067 |
| | | | | 248/548 |
| 2014/0284236 | A1* | 9/2014 | Kuebart ............. | B65D 81/022 |
| | | | | 206/413 |
| 2015/0069207 | A1* | 3/2015 | Arner ................ | F01N 13/017 |
| | | | | 248/677 |
| 2015/0251845 | A1* | 9/2015 | Jotz ................. | B65D 25/10 |
| | | | | 206/408 |
| 2018/0222665 | A1* | 8/2018 | Goodrich ............ | B65D 5/02 |

FOREIGN PATENT DOCUMENTS

| CN | 211338354 | U | 8/2020 |
| CN | 211811147 | U | 10/2020 |
| CN | 212655297 | U | 3/2021 |
| CN | 213112022 | U | 5/2021 |
| EP | 3889072 | A1 | 10/2021 |
| JP | 2003137426 | A | 5/2003 |
| JP | 2017067275 | A | 4/2017 |

OTHER PUBLICATIONS

The European Patent Office (EPO) The Extended European Search Report for Application No. 21969430.4 Aug. 21, 2024 9 Pages.
The European Patent Office (EPO) Communication pursuant to Article 94(3) EPC for Application No. 21969430.4 Jun. 20, 2025 6 Pages.
State Intellectual Property Office of China The First Office Action for Application No. 202180096950.7 Jul. 26, 2025 13 pages (including translation).

* cited by examiner (a)

(b)

PROTECTIVE APPARATUS AND TRANSPORT APPARATUS

CROSS-REFERENCE TO RELATED APPLICATION

This application is a continuation of International Application No. PCT/CN2021/142511, filed on Dec. 29, 2021, the entire content of which is incorporated herein by reference.

TECHNICAL FIELD

Embodiments of the present application relate to the technical field of batteries, and in particular to a protective apparatus and a transport apparatus.

BACKGROUND ART

In recent years, lithium-ion batteries have been extensively applied to electronic devices, such as computers and mobile phones, and traction battery systems of new energy vehicles because of their advantages of high energy density, high power density, long service life and environmental friendliness.

A battery refers to a physical module including one or more battery cells (also referred to as cells) to supply voltage. The battery cell includes a positive electrode plate, a negative electrode plate, an electrolyte solution and a separator. During manufacturing of the battery, the electrode plates that are well processed usually need to be transported to somewhere else for the next step of manufacturing. How to reduce the risk of misalignment of the electrode plates during transportation of the electrode plates is a problem that needs to be solved at present.

SUMMARY

In view of the above problem, embodiments of the present application provide a protective apparatus and a transport apparatus, which can reduce the risk of misalignment of electrode plates during transportation of the electrode plates.

According to a first aspect of the embodiments of the present application, a protective apparatus is provided to protect electrode plates, the protective apparatus including: a support assembly, the support assembly being configured to support a roll around which the electrode plates are wound; and a damping assembly, the top of the damping assembly being fixed to the bottom of the support assembly, and the bottom of the damping assembly being configured to be fixed to a base plate of a transport apparatus.

In the embodiments of the present application, during transportation of the electrode plates, an impact force on the transport apparatus is transmitted from the base plate of the transport apparatus to the damping assembly, and the damping assembly can absorb a part or even most of the impact force. In addition, the top of the damping assembly is fixed to the bottom of the support assembly, and the bottom of the damping assembly is fixed to the base plate of the transport apparatus, that is, the damping assembly is arranged inside the transport apparatus, so that the damping assembly needs to damp vibration of only the support assembly, and the roll and the electrode plates that are supported by the support assembly, but not other components, reducing the damping weight of the damping assembly is reduced and achieving a good damping effect. In this way, the impact force transmitted to the electrode plates is reduced, the risk of misalignment between the electrode plates caused by a large impact force is reduced, the risk of scrapping of the electrode plates is reduced, and the yield of the electrode plates is improved.

In some embodiments, the damping assembly includes a damping member and a fixing frame; and the top of the damping member is fixed to the bottom of the support assembly, the bottom of the damping member is fixed to the top of the fixing frame, and the bottom of the fixing frame is fixed to the base plate of the transport apparatus.

The damping assembly is provided with the damping member, and the fixing frame and the damping member are fixed between the support assembly and the base plate of the transport apparatus, so that the damping member can absorb the impact force on the transport apparatus during transportation, reducing the impact force transmitted to the electrode plates, and reducing the risk of misalignment between the electrode plates caused by a large impact force; and the damping member is fixed by means of the fixing frame, so that the damping member can be prevented from moving or separating from between the support assembly and the base plate of the transport apparatus, which affects the damping effect.

In some embodiments, the damping member includes a first fixing portion, a second fixing portion and a damping unit; and the first fixing portion is fixed to the support assembly, the damping unit is fixed between the first fixing portion and the second fixing portion, and the second fixing portion is fixed to the fixing frame.

The damping member is provided with the damping unit, and the damping unit is fixed between the support assembly and the fixing frame by means of the first fixing portion and the second fixing portion, so that the damping unit is fixed between the support assembly and the base plate of the transport apparatus, and the damping unit can absorb the impact force on the transport apparatus during transportation, reducing the impact force transmitted to the electrode plates, and reducing the risk of misalignment between the electrode plates caused by a large impact force; and the damping unit is fixed by means of the first fixing portion and the second fixing portion, so that the damping unit can be prevented from moving or separating from between the support assembly and the base plate of the transport apparatus, which affects the damping effect.

In some embodiments, the damping unit includes an elastic element or a hydraulic element. The elastic element or the hydraulic element has a good damping effect.

In some embodiments, the support assembly includes a support portion, a clamp is arranged on the support portion, and an accommodating space for accommodating the roll is formed between the support portion and the clamp.

The support assembly is provided with the support portion and the clamp, and the accommodating space for accommodating the roll is formed between the support portion and the clamp, so that the roll can be accommodated in the accommodating space, which facilitates support of the roll.

In some embodiments, in the accommodating space, the support portion is provided with a first buffer pad, and/or the clamp is provided with a second buffer pad.

The support portion is provided with the first buffer pad located in the accommodating space, which changes a rigid contact between the roll and the support portion into a flexible contact, and/or the clamp is provided with the second buffer pad located in the accommodating space, which changes a rigid contact between the roll and the clamp into a flexible contact, not only reducing wear between the roll and the support portion and the clamp but also increasing friction between the roll and the support portion and the clamp, which enables the roll to be less likely to move or separate from the support assembly, and further relieving a vertical impact force transmitted to the roll and the electrode plates.

In some embodiments, the material of the first buffer pad includes rubber, polyethylene or silicone, and/or the material of the second buffer pad includes rubber, polyethylene or silicone.

Rubber, polyethylene or silicone is chosen to prepare the first buffer pad and/or the second buffer pad, so that the first buffer pad and/or the second buffer pad can have an excellent buffering effect and can be durable.

In some embodiments, the first buffer pad and/or the second buffer pad have/has a thickness ranging from 4 mm to 20 mm.

The first buffer pad and/or the second buffer pad have/has a thickness ranging from 4 mm to 20 mm, which can achieve an excellent buffering effect and ensure that the accommodating space is enough for the roll.

In some embodiments, the fixing frame includes an outer fixing frame and an inner fixing frame, the damping member is fixed to the inner fixing frame, the inner fixing frame is removably connected to the outer fixing frame, and the outer fixing frame is configured to be fixed to the base plate of the transport apparatus.

The fixing frame is divided into the outer fixing frame and the inner fixing frame, the damping member is fixed to the inner fixing frame, the outer fixing frame is fixed to the base plate of the transport apparatus, and the inner fixing frame is removably connected to the outer fixing frame, so that the damping member can be disconnected from the base plate of the transport apparatus after the inner fixing frame is disassembled from the outer fixing frame, which facilitates replacement and maintenance of the damping member.

In some embodiments, the fixing frame includes an outer fixing frame and an inner fixing frame, the damping member is fixed to the inner fixing frame, and the outer fixing frame is fixed to the base plate of the transport apparatus; and the inner fixing frame is rotatable relative to the outer fixing frame, and drives the damping member and the support assembly to rotate and then lay on the base plate.

The inner fixing frame rotates relative to the outer fixing frame, and the damping member and the support assembly fixed to the damping member can rotate relative to the outer fixing frame together with the inner fixing frame and then lay on the base plate of the transport apparatus. In this way, in the case where the roll is not placed on the support assembly, the inner fixing frame, the damping member and the support assembly are as a whole changed from a vertical state before rotation to a horizontal placement state after rotation, which reduces the space occupied by the above components in the vertical direction, thereby saving their storage space.

In some embodiments, a rotation limiter is arranged between the inner fixing frame and the outer fixing frame for limiting the inner fixing frame when the inner fixing frame rotates relative to the outer fixing frame.

The rotation limiter is arranged between the inner fixing frame and the outer fixing frame, so that the inner fixing frame is not separated from the outer fixing frame during rotation in which the inner fixing frame, the damping member and the support assembly lay on the base plate of the transport apparatus as a whole, and the inner fixing frame does not need to be repositioned when the inner fixing frame, the damping member and the support assembly are subsequently restored to the vertical state, which is convenient to operate.

In some embodiments, the outer fixing frame is provided with an engagement groove, the inner fixing frame is provided with an engagement block, and the engagement block is embedded into the engagement groove; and the engagement block is removable from the engagement groove when the inner fixing frame is disassembled from the outer fixing frame.

The outer fixing frame is provided with the engagement groove, the inner fixing frame is provided with the engagement block, and the engagement block is embedded into the engagement groove, so that the assembly between the inner fixing frame and the outer fixing frame can be positioned to ensure the overall structural strength of the fixing frame. The engagement block is in clearance fit with the engagement groove, so that when the inner fixing frame is disassembled from the outer fixing frame, the engagement block can be removed from the engagement groove without affecting rotation of the inner fixing frame relative to the outer fixing frame.

In some embodiments, one end of the clamp is rotatably connected to the support portion, and the other end of the clamp is removably connected to the support portion.

One end of the clamp is rotatably connected to the support portion, and the other end of the clamp is removably connected to the support portion, so that after the other end of the clamp is disassembled, the clamp can be rotated to provide an entrance for the roll to be vertically placed downwards into the accommodating space on the support assembly, which facilitates placement of the roll and improves the packing efficiency of the electrode plates before transportation. In addition, one end of the clamp is rotationally connected to the support portion, and this end doe not need to be disassembled, which further improves the operation efficiency.

In some embodiments, the support assembly further includes a clamp holder arranged on the support portion, the clamp holder being configured to hold the clamp disassembled from the support portion.

The clamp holder is provided to hold the clamp disassembled from the support portion, preventing the movement of the disassembled clamp.

According to a second aspect of the embodiments of the present application, a transport apparatus is provided, including a protective apparatus as described in the above embodiments, the protective apparatus being arranged on the base plate of the transport apparatus.

In the embodiments of the present application, during transportation of the electrode plates, an impact force on the transport apparatus is transmitted from the base plate of the transport apparatus to the damping assembly, and the damping assembly can absorb a part or even most of the impact force. In addition, the top of the damping assembly is fixed to the bottom of the support assembly, and the bottom of the damping assembly is fixed to the base plate of the transport apparatus, that is, the damping assembly is arranged inside the transport apparatus, so that the damping assembly needs to damp vibration of only the support assembly, and the roll and the electrode plates that are supported by the support assembly, but not other components in the transport apparatus, reducing the damping weight of the damping assembly and achieving a good damping effect. In this way, the impact force transmitted to the electrode plates is reduced, the risk of misalignment between the electrode plates caused by a large impact force is reduced, the risk of scrapping of the electrode plates is reduced, and the yield of the electrode plates is improved.

In some embodiments, the transport apparatus further includes: a dust cover, the dust cover covering the damping member.

The dust cover covering the damping member is provided such that dust or other impurities can be prevented from entering the damping member, and the damping effect of the damping member cannot be affected by dust and other impurities, which ensures the damping performance of the damping member.

In some embodiments, the transport apparatus further includes the roll, wherein the roll is placed on the support assembly after the electrode plates are wound around the roll; and the material of the roll includes metal.

The metal roll can reduce the risk of misalignment of the electrode plates caused by an external impact force greater than friction between the roll and the electrode plates and between layers of the electrode plates.

In some embodiments, the roll has a diameter of ≥300 mm.

The diameter of the roll is ≥300 mm, so that the total pressure on the surface of the electrode plate is increased, and the tension of the electrode plate is increased during winding of the electrode plate, thereby increasing the friction between the layers of the electrode plates and reducing the risk of misalignment of the electrode plates.

The above description is only an overview of the technical solutions of the present application. In order to more clearly understand the technical means of the present application to implement same according to the contents of the description, and in order to make the above and other objectives, features and advantages of the present application more obvious and understandable, specific implementations of the present application are exemplarily described below.

BRIEF DESCRIPTION OF THE DRAWINGS

Features, advantages, and technical effects of exemplary embodiments of the present application will be described below with reference to accompanying drawings.

Figure 1:
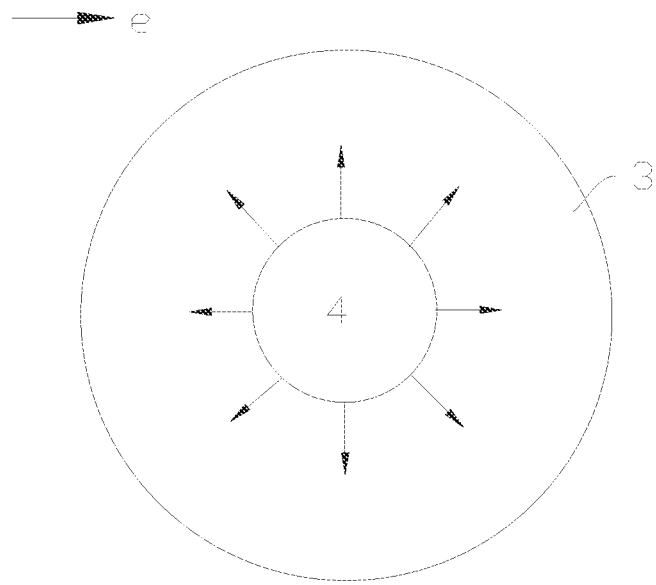
FIG. 1 is a schematic diagram of an impact force acting on electrode plates.
Figure 1:
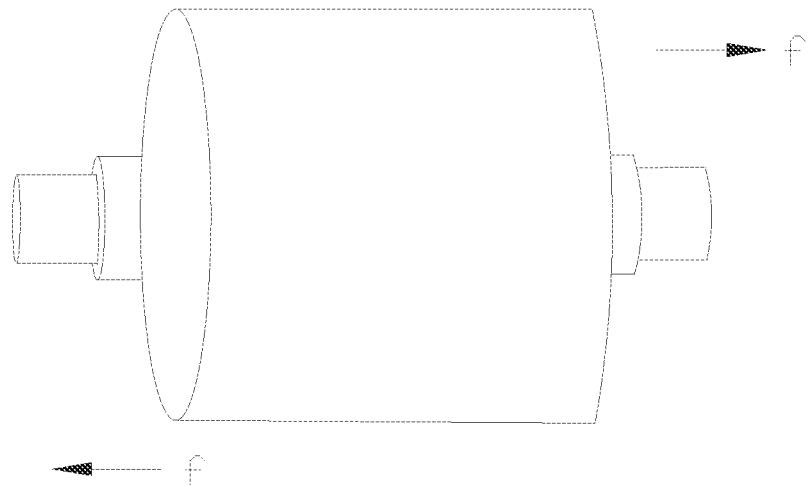

In the drawings, the figures are not necessarily drawn to scale.

REFERENCE SIGNS

10—Transport apparatus, 20—Protective apparatus;
11—Base plate, 12—Outer cover;
2—Support assembly, 3—Electrode plate, 4—Roll, 5—Damping assembly, 6—Dust cover;
21—Support portion, 211—Baffle, 22—Clamp, 221—Fixing plate, 23—Accommodating space, 24—Second buffer pad, 25—Clamp holder;
51—Damping member, 511—First fixing portion, 512—Second fixing portion, 513—Damping unit,
52—Fixing frame, 521—Outer fixing frame, 521a—Engagement groove, 522—Inner fixing frame, 522a—Through hole, 522b—Engagement block, 523—Rotating shaft.

DETAILED DESCRIPTION OF EMBODIMENTS

In order to make the objectives, technical solutions and advantages of embodiments of the present application clearer, the technical solutions in the embodiments of the present application will be described clearly below with reference to the accompanying drawings in the embodiments of the present application. Obviously, the embodiments described are some of, rather than all of, the embodiments of the present application. All other embodiments obtained by those of ordinary skill in the art based on the embodiments of the present application without any creative effort shall fall within the scope of protection of the present application.

In order to make the objectives, technical solutions and advantages of embodiments of the present application clearer, the technical solutions in the embodiments of the present application will be described clearly and completely below with reference to the accompanying drawings in the embodiments of the present application. Apparently, the embodiments described are some of, rather than all of, the embodiments of the present application. Based on the embodiments of the present application, all other embodiments obtained by those of ordinary skill in the art without any creative effort fall within the scope of protection of the present application.

It should be noted that, unless otherwise stated, the technical terms or scientific terms used in the embodiments of the present application should have their ordinary meanings as understood by those skilled in the art to which the embodiments of the present application belong.

In the description of the embodiments of the present application, the orientation or position relationship indicated by the technical terms "central", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. are based on the orientation or position relationship shown in the accompanying drawings and are merely intended to facilitate and simplify the description of the embodiments of the present application, rather than indicating or implying that the apparatus or element considered must have a particular orientation or be constructed and operated in a particular orientation, and therefore not to be construed as limiting the embodiments of the present application.

In addition, the technical terms "first", "second", etc. are used for descriptive purposes only, and cannot be construed as indicating or implying relative importance or implicitly indicating the number of technical features indicated, nor are they used to describe a particular order or primary-secondary relationship.

The term "and/or" herein is merely the description of an associated relationship of associated objects, and indicates that three relationships may exist. For example, "A and/or B" can be expressed as: only A exists, both A and B exist, and only B exists. In addition, the character "/" herein generally indicates an "or" relationship between the associated objects.

In the present application, "a plurality of" means two or more (including two), similarly, "a plurality of groups" means two or more groups (including two groups), and "a plurality of pieces" means two or more pieces (including two pieces), unless otherwise specifically defined.

In the description of the embodiments of the present application, unless otherwise explicitly specified and defined, the technical terms such as "mount", "couple", "connect", and "fix" should be understood in a broad sense, for example, they may be a fixed connection, a detachable connection, or an integrated connection; may be a mechanical connection or an electric connection; and may be a direct connection or an indirect connection by means of an intermediate medium, or may be internal communication between two elements or interaction between the two elements. For those of ordinary skill in the art, the specific meanings of the above terms in the embodiments of the present application can be understood according to specific situations.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. It can be understood by those skilled in the art that the embodiment described herein may be combined with another embodiment.

In recent years, lithium-ion batteries have been extensively applied to electronic devices, such as computers and mobile phones, and traction battery systems of new energy vehicles because of their advantages of high energy density, high power density, long service life and environmental friendliness.

A battery mentioned in embodiments of the present application refers to a single physical module including one or more battery cells to provide a higher voltage.

The battery cell generally includes a shell and an electrode assembly received in the shell, with an electrolyte being filled in the shell. The electrode assembly usually includes a positive electrode plate, a negative electrode plate and a separator. The positive electrode plate and the negative electrode plate can be collectively referred to as electrode plates. The positive electrode plate, the negative electrode plate and the separator are stacked and then wound around a winding axis to form a winding structure. The positive electrode plate includes a positive current collector and a positive active material layer. A surface of the positive current collector is coated with the positive active material layer. Taking a lithium-ion battery as an example, the positive current collector may be made of aluminum, and the positive active material layer includes a positive active material which may be lithium cobalt oxides, lithium iron phosphate, ternary lithium, lithium manganate, etc. The negative electrode plate includes a negative current collector and a negative active material layer. A surface of the negative current collector is coated with the negative active material layer. The negative current collector may be made of copper, and the negative active material layer includes a negative active material which may be carbon, silicon, etc. The separator may be made of polypropylene (PP), polyethylene (PE), etc.

After being processed, the electrode plates of the battery needs to be assembled with other parts to form the battery. If the place where the electrode plates are located and the place where the battery is assembled are not the same place, for example, an electrode plate processing workshop and a battery assembly workshop are not the same workshop, or an electrode plate processing factory and a battery assembly factory are not the same factory, it is needed to transfer the electrode plates from the place where the electrode plates are processed to the place where the battery is assembled.

When being transported, the electrode plates are usually wound around a roll first, and the wound electrode plates are erected in a box and then transported. Such transportation is usually long-distance transportation, which requires the use of long-distance transportation means, such as cars, trains and ships. The transportation means will vibrate during travel, and the vibration will be transmitted to the box. Moreover, in the process of transporting the box to and from the transportation means, the box will also vibrate. An impact force on the box due to vibration will be transmitted to the electrode plates, resulting in misalignment between the electrode plates. If the misalignment of the electrode plates exceeds a rectification range of the device, the misaligned electrode plates cannot be corrected back to their original position, and the electrode plates cannot be used in the subsequent cold-pressing or slitting process, resulting in scrapping of the electrode plates.

Further, The inventor found that during long-distance transportation or even international long-distance transportation, the external impact force on the electrode plates includes: a vertical impact force a generated on the electrode plates when a vertical impact force is generated on the transportation means under different road conditions; an impact force b generated on the electrode plates in a driving direction when an acceleration (including positive acceleration and negative acceleration) in the driving direction acts on the electrode plates while the transportation means is accelerating or decelerating; an impact force c resulted from an acceleration of steering generated on the electrode plates in a direction that is located in the same horizontal plane as the driving direction and is perpendicular to the driving direction while the transportation means is steering; and a vertical impact force d generated on the electrode plates during transfer by the transportation means (loading and unloading of containers).

The impact forces a, c and d act on a package box of the electrode plates, and the impact forces are transmitted to the electrode plates via the package box, thus generating an impact force e on the electrode plates. A gap is formed between layers of the electrode plates due to the impact force e acting on the electrode plates (as shown by (a) in FIG. 1), thus reducing friction between the electrode plates. Further, The impact forces a, b and c act on the package box and are transmitted to the electrode plates, so that the electrode plates are subjected to a total impact force f (as shown by (b) in FIG. 1). In the case where the impact force f is greater than the friction between the electrode plates, the electrode plates may be misaligned.

Therefore, how to damp vibration of the electrode plates during transportation, reduce the impact force transmitted to the electrode plates and reduce the degree of misalignment of the electrode plates is a problem that needs to be solved at present.

Figure 2:
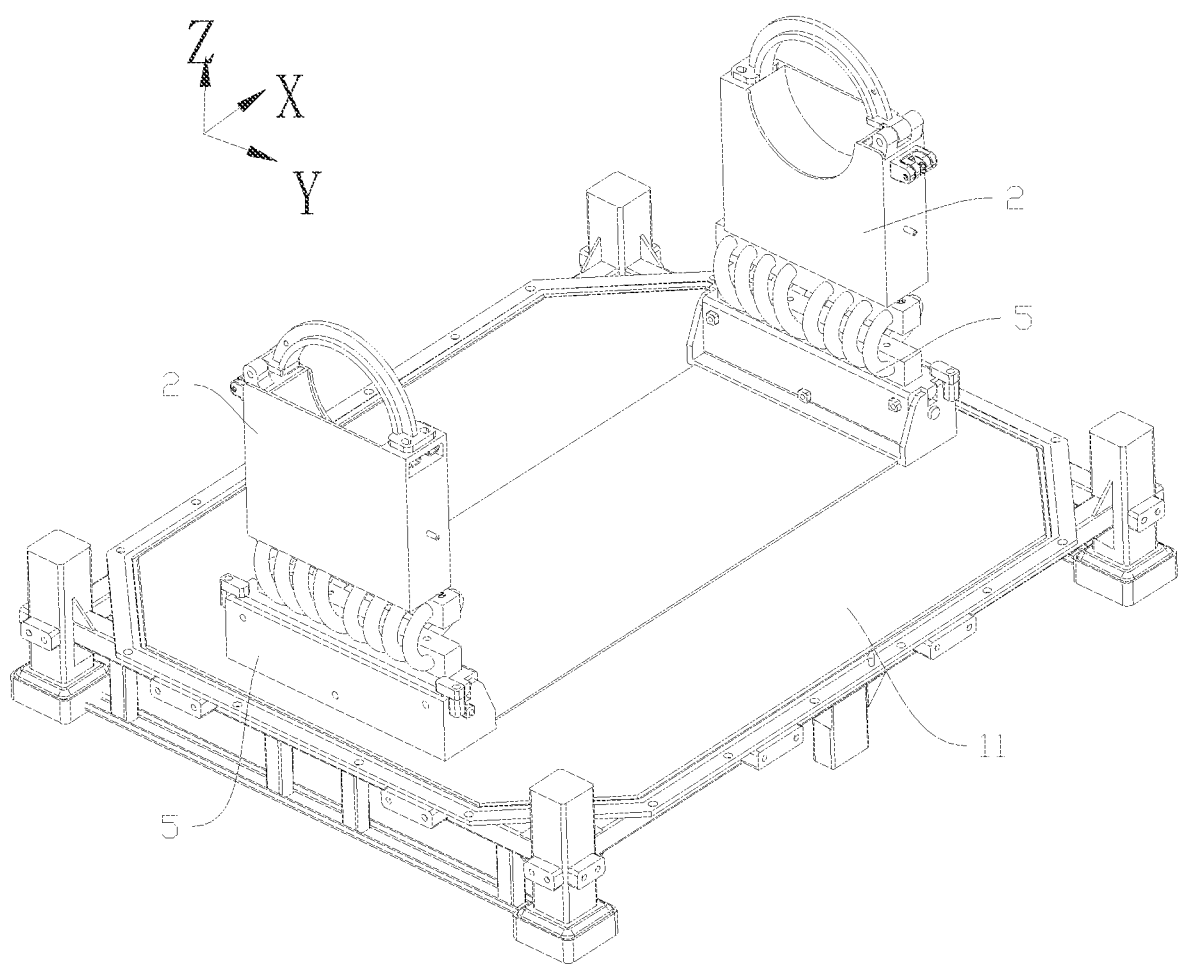
FIG. 2 is a schematic structural diagram of a protective apparatus being fixed to a base plate of a transport apparatus according to some embodiments of the present application.

In view of this, the present application provides a protective apparatus. FIG. 2 is a schematic structural diagram of a protective apparatus being fixed to a base plate of a transport apparatus according to some embodiments of the present application, and FIG. 3 is a schematic diagram of a roll around which electrode plates are wound being arranged on the protective apparatus.

Figure 3:
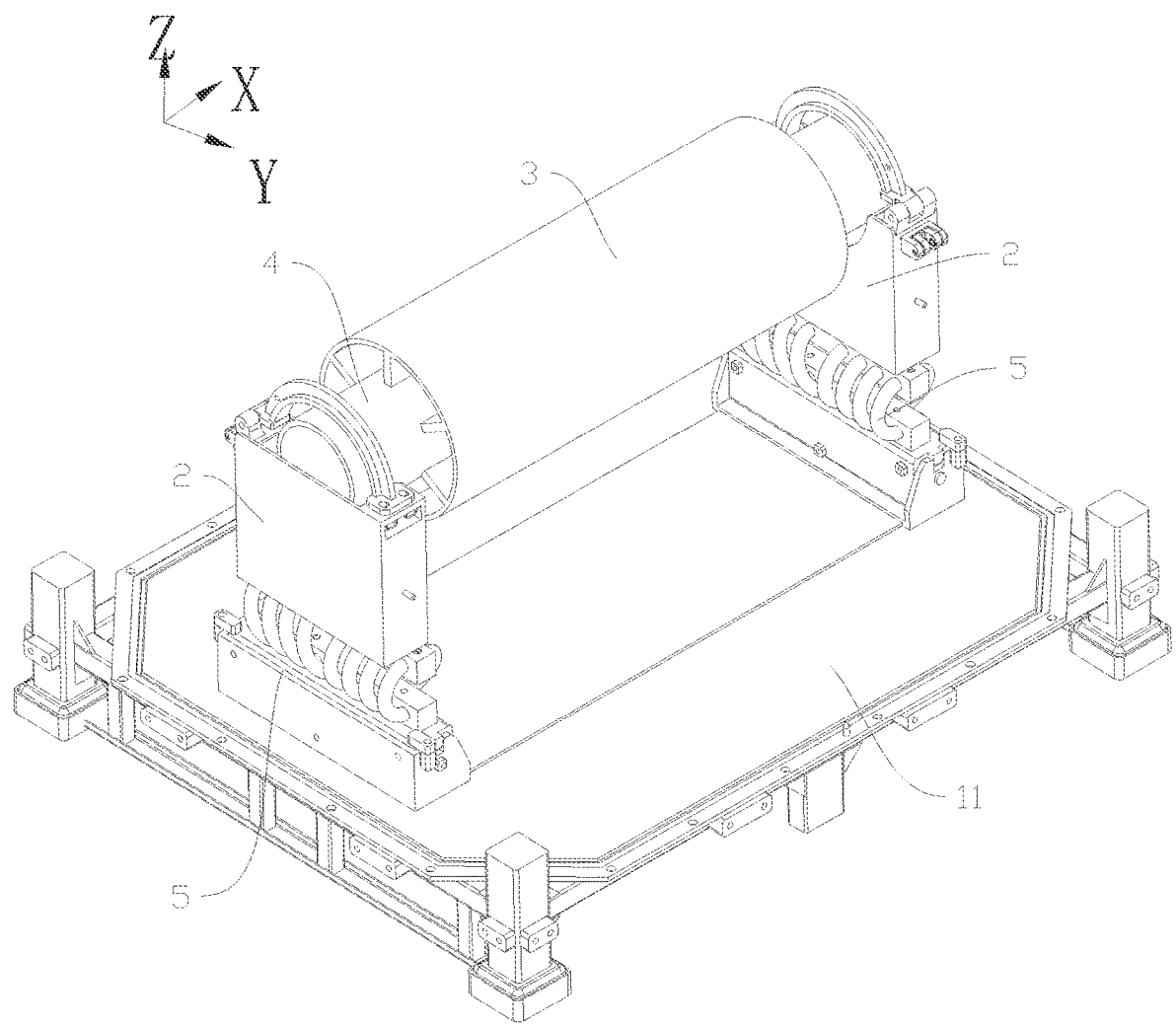
FIG. 3 is a schematic diagram of a roll around which electrode plates are wound being arranged on the protective apparatus.
Figure 4:
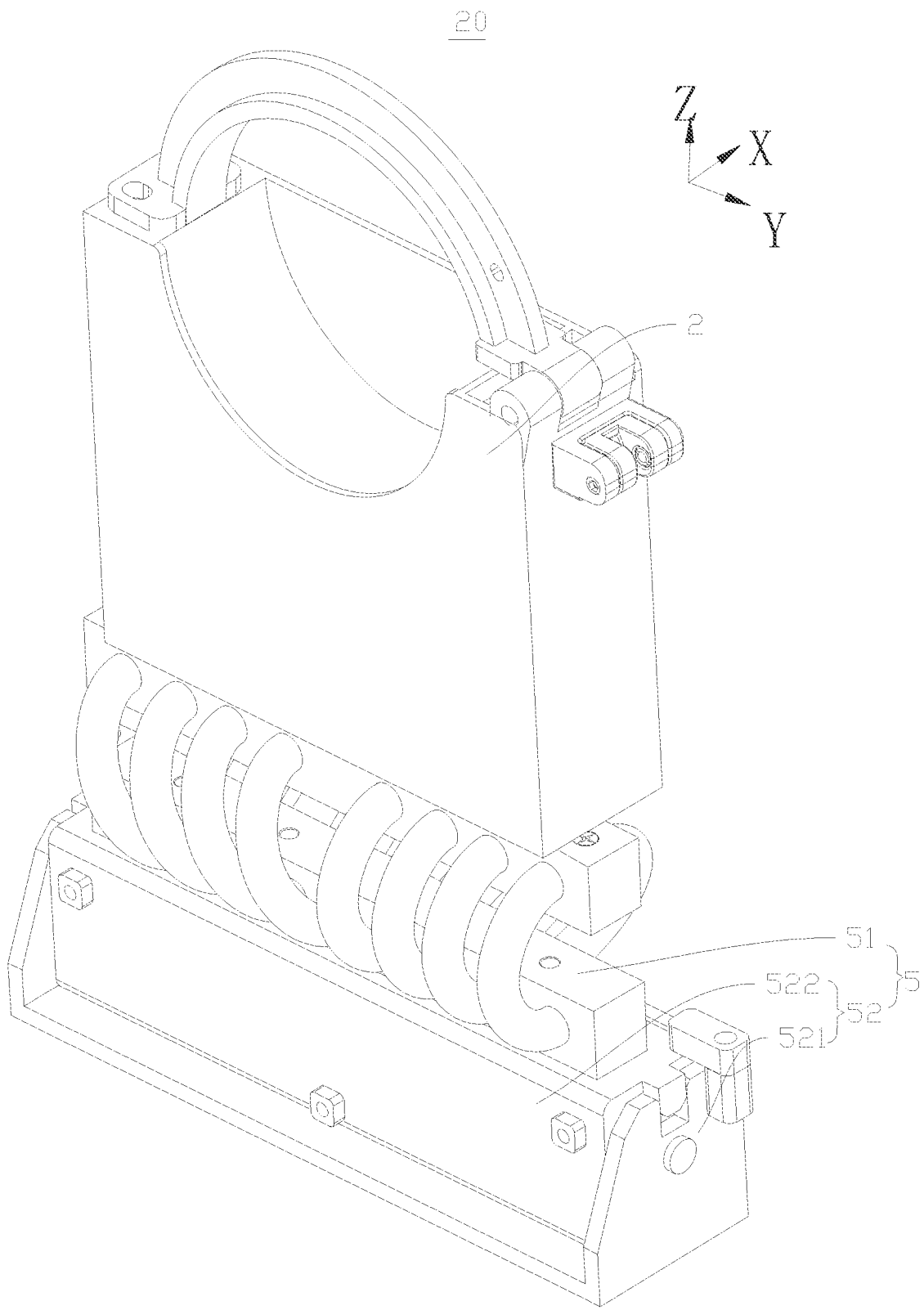
FIG. 4 is a schematic structural diagram of a support assembly and a damping assembly.

Referring to FIGS. 2 and 3, the protective apparatus 20 is configured to protect electrode plates 3, and the protective apparatus 20 includes a support assembly 2 and a damping assembly 5. The support assembly 2 is configured to support a roll 4 (as shown in FIG. 4) around which the electrode plates 3 are wound. The top of the damping assembly 5 is fixed to the bottom of the support assembly 2, and the bottom of the damping assembly 5 is configured to be fixed to a base plate 11 of a transport apparatus.

In the figures, an X-axis direction is an axial direction of the roll 4, a Y-axis direction is a direction perpendicular to the X-axis direction in a horizontal plane, and a Z-axis direction is a direction perpendicular to the X-axis direction in a vertical plane.

"Top" and "bottom" refer to the top and the bottom of each component in the Z-axis direction. For example, the top of the damping assembly 5 refers to a top surface of the damping assembly 5 in the Z-axis direction, the bottom of the support assembly 2 refers to a bottom surface of the support assembly 2 in the Z-axis direction, and the bottom of the damping assembly 5 refers to a bottom surface of the damping assembly 5 in the Z-axis direction.

Referring to FIG. 3, the electrode plates 3 are wound around the roll 4, and specifically around the middle of the roll 4, and the electrode plates 3 are not wound around two ends of the roll 4 abutting against the support assembly 2, so that the electrode plates 3 are prevented from abutting against the support assembly 2, which causes damage to the electrode plates 3 or brings inconvenience for assembly of the roll 4 on the support assembly 2. The support assembly 2 supports the roll 4 around which the electrode plates 3 are wound. The roll 4 is suspended to protect the electrode plates 3 from being pressed and protect the electrode plates 3 against damage.

The top of the damping assembly 5 is fixed to the bottom of the support assembly 2, and the bottom thereof is fixed to the base plate 11 of the transport apparatus, so that the damping assembly 5 is fixed between the base plate 11 of the transport apparatus and the support assembly 2. An impact force on the transport apparatus can first be transmitted to the damping assembly 5 by means of the base plate 11, then to the support assembly 2, and then to the roll 4 and the electrode plates 3, so that vibration of the electrode plates 3 can be damped by means of the damping assembly 5.

The above-mentioned components may be fixed by means of welding, riveting, screwing, etc.

In the embodiments of the present application, during transportation of the electrode plates 3, the impact force on the transport apparatus is transmitted from the base plate 11 of the transport apparatus to the damping assembly 5, and the damping assembly 5 can absorb a part or even most of the impact force. In addition, the top of the damping assembly 5 is fixed to the bottom of the support assembly 2, and the bottom of the damping assembly 5 is fixed to the base plate 11 of the transport apparatus, that is, the damping assembly 5 is arranged inside the transport apparatus, so that the damping assembly 5 needs to damp vibration of only the support assembly 2, and the roll 4 and the electrode plates 3 that are supported by the support assembly 2, but not other components, reducing the damping weight of the damping assembly 5 and achieving a good damping effect. In this way, the impact force transmitted to the electrode plates 3 is reduced, the risk of misalignment between layers of the electrode plates 3 caused by a large impact force is reduced, the risk of scrapping of the electrode plates 3 is reduced, and the yield of the electrode plates 3 is improved.

If a damping design is adopted on an outer side of the transport apparatus, the total weight to be damped not only includes the roll 4, the electrode plates 3 and the support assembly 2, but also the base plate of the transport apparatus and other components (for example, a box or a cover of the transport apparatus) arranged on the damping assembly, which may exceed the damping capability of the damping assembly and result in an undesirable damping effect. Compared with the above method, in the embodiments of the present application, the damping assembly 5 is arranged inside the transport apparatus between the base plate 11 of the transport apparatus and the support assembly 2 for supporting the roll 4, so that the damping assembly 5 is closer to the electrode plates 3, and the damping assembly 5 needs to damp vibration of the weights of only the support assembly 2, the roll 4 and the electrode plates 3 but not the base plate of the transport apparatus and other components arranged above the damping assembly. The damping assembly 5 has enough damping capability to damp vibration of the weights of the above components. The weight with the vibration to be damped is reduced, a good damping effect is achieved, and the electrode plates 3 are less likely to be misaligned during long-term and long-distance transportation of the electrode plates 3.

FIG. 4 is a schematic structural diagram of the support assembly and the damping assembly. Referring to FIG. 4 and further referring to FIG. 3, the damping assembly 5 includes a damping member 51 and a fixing frame 52. The top of the damping member 51 is fixed to the bottom of the support assembly 2, the bottom of the damping member 51 is fixed to the top of the fixing frame 52, and the bottom of the fixing frame 52 is fixed to the base plate 11 of the transport apparatus.

In the damping assembly 5, the damping member 51 is configured to absorb the impact force and damp vibration, and the fixing frame 52 is configured to fix the damping member 51 between the support assembly 2 and the base plate 11 of the transport apparatus.

The damping assembly 5 is provided with the damping member 51, and the fixing frame 52 and the damping member 51 are fixed between the support assembly 2 and the base plate 11 of the transport apparatus, so that the damping member 51 can absorb the impact force on the transport apparatus during transportation, reducing the impact force transmitted to the electrode plates 3, and reducing the risk of misalignment between layers of the electrode plates 3 caused by a large impact force; and the damping member 51 is fixed by means of the fixing frame 52, so that the damping member 51 can be prevented from moving or separating from between the support assembly 2 and the base plate 11 of the transport apparatus, which affects the damping effect.

Figure 5:
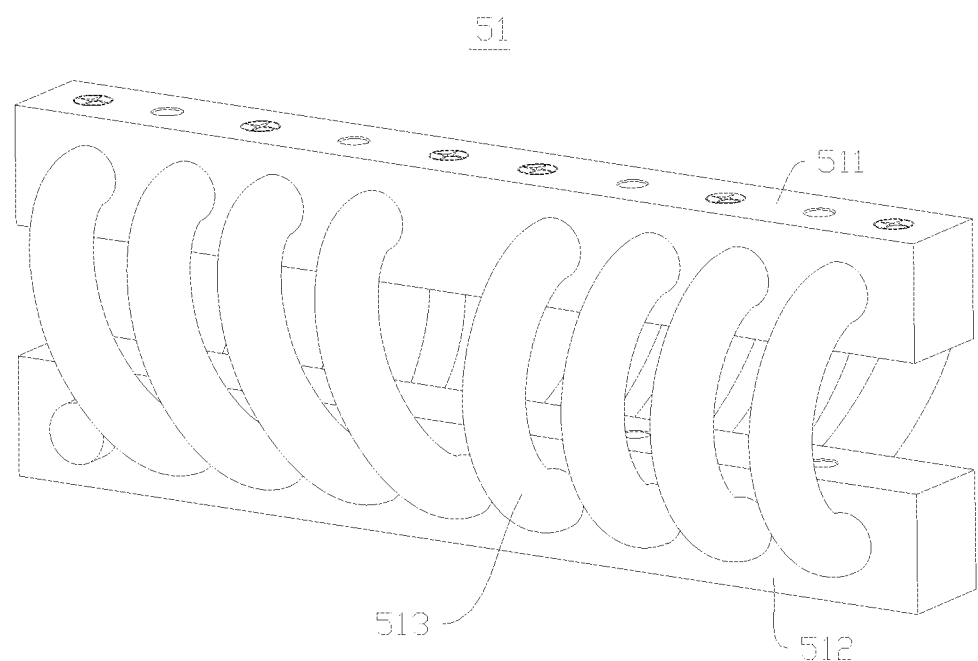
FIG. 5 is a schematic structural diagram of the damping assembly.

FIG. 5 is a schematic structural diagram of the damping assembly. Referring to FIG. 5 and further referring to FIG. 2, the damping member 51 includes a first fixing portion 511, a second fixing portion 512 and a damping unit 513. The first fixing portion 511 is fixed to the support assembly 2, the damping unit 513 is fixed between the first fixing portion 511 and the second fixing portion 512, and the second fixing portion 512 is fixed to the fixing frame 52.

The damping unit 513 is configured to absorb the impact force and damp vibration. The first fixing portion 511 is located at the top of the damping unit 513, and the second fixing portion 512 is located at the bottom of the damping unit 513. The damping unit 513 is fixed to the support assembly 2 by means of the first fixing portion 511, and the damping unit 513 is fixed to the fixing frame 52 by means of the second fixing portion 512. The above-mentioned components may be fixed by means of welding, riveting, screwing, etc.

The damping member 51 is provided with the damping unit 513, and the damping unit 513 is fixed between the support assembly 2 and the fixing frame 52 by means of the first fixing portion 511 and the second fixing portion 512, so that the damping unit 513 is fixed between the support assembly 2 and the base plate 11 of the transport apparatus, and the damping unit 513 can absorb the impact force on the transport apparatus during transportation, reducing the impact force transmitted to the electrode plates 3, and reducing the risk of misalignment between layers of the electrode plates 3 caused by a large impact force; and the damping unit 513 is fixed by means of the first fixing portion 511 and the second fixing portion 512, so that the damping unit 513 can be prevented from moving or separating from between the support assembly 2 and the base plate 11 of the transport apparatus, which affects the damping effect.

In some embodiments, the damping unit 513 includes an elastic element or a hydraulic element.

The elastic element may be a spring, a spring leaf or a rubber damping pad, a silicone damping pad, etc., and the hydraulic element may be various types of hydraulic dampers. The elastic element or the hydraulic element has a good damping effect.

The damping unit 513 shown in FIG. 5 is an omnidirectional damping spring. A plurality of fixing holes are provided in each of the first fixing portion 511 and the second fixing portion 512. The omnidirectional damping spring runs through the fixing holes of the first fixing portion 511 and the second fixing portion 512, so that the omnidirectional damping spring is fixed between the first fixing portion 511 and the second fixing portion 512. It should be understood by those skilled in the art that the figure shows only an example, the damping unit 513 may be any other element capable of achieving a damping function, such as the above-mentioned other elastic elements or hydraulic elements, and the fixing means may also be any other means by means of which the damping unit 513 can be fixed between the first fixing portion 511 and the second fixing portion 512, such as welding, riveting, gluing and screwing.

If the damping unit 513 can relieve only the impact forces a and d in the vertical direction but not the impact forces b and c in the horizontal direction, the misalignment of the electrode plates 3 cannot be well prevented. Therefore, in some embodiments, the damping unit 513 may be an omnidirectional damping unit to realize omnidirectional damping of the electrode plates 3 in the horizontal plane and the vertical plane. In this way, the impact forces in all directions can be effectively relieved during transportation of the electrode plates 3. Not only the impact forces a and d in the vertical direction but also the impact forces in other directions (including but not limited to the impact forces b and c in the horizontal direction caused by acceleration, deceleration, turning and tilting) can be relieved to prevent the misalignment of the electrode plates 3 due to impacts on the electrode plates 3 in all directions.

Figure 6:
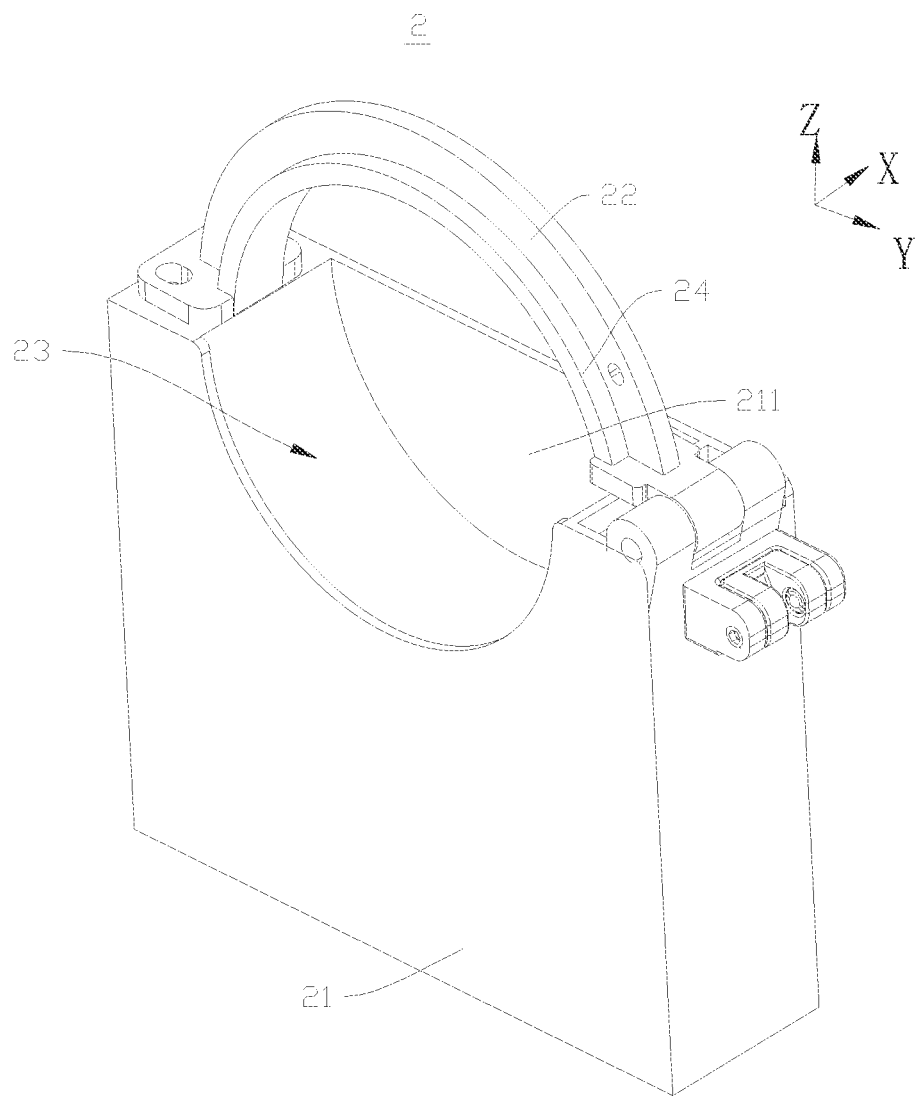
FIG. 6 is a schematic structural diagram of the support assembly.

FIG. 6 is a schematic structural diagram of the support assembly. Referring to FIG. 6 and further referring to FIG. 3, the support assembly 2 includes a support portion 21, a clamp 22 is arranged on the support portion 21, and an accommodating space 23 for accommodating the roll 4 is formed between the support portion 21 and the clamp 22.

An accommodating groove is provided in the top of the support portion 21, with the shape of the accommodating groove being substantially adapted to the shape of the portion of the roll 4 placed in the accommodating groove. The clamp 22 is in snap-fit with the top of the accommodating groove, so that the accommodating space 23 for accommodating the roll 4 is formed between the support portion 21 and the clamp 22, with the shape of the accommodating space 23 being substantially adapted to the shape of the roll 4 placed in the accommodating groove.

As shown in FIG. 2, the roll 4 is cylindrical. As shown in FIG. 6, the accommodating space 23 formed between the support portion 21 and the clamp 22 for accommodating the roll 4 is also substantially cylindrical correspondingly. The accommodating groove provided in the support portion 21 is an arc-shaped groove, the clamp 22 is also arc-shaped, and the two cooperate to form the cylindrical accommodating space 23 with a circular cross section.

It should be understood by those skilled in the art that the figure shows only an example, and the clamp 22 may also not be arc-shaped and may be, for example, square, and an arc-shaped groove is provided in the square clamp to cooperate with the arc-shaped groove provided in the support portion to form a cylindrical accommodating space.

The support assembly 2 is provided with the support portion 21 and the clamp 22, and the accommodating space 23 for accommodating the roll 4 is formed between the support portion 21 and the clamp 22, so that the roll 4 can be accommodated in the accommodating space 23, which facilitates support of the roll 4.

In the accommodating space 23, the support portion 21 is provided with a first buffer pad, or the clamp 22 is provided with a second buffer pad, or the support portion 21 is provided with a first buffer pad and the clamp 22 is provided with a second buffer pad.

The support portion 21 is provided with the first buffer pad located in the accommodating space 23, which changes a rigid contact between the roll 4 and the support portion 21 into a flexible contact, and/or the clamp 22 is provided with the second buffer pad located in the accommodating space 23, which changes a rigid contact between the roll 4 and the clamp 22 into a flexible contact, not only reducing wear between the roll 4 and the support portion 21 and the clamp 22 but also increasing friction between the roll 4 and the support portion 21 and the clamp 22, which enables the roll 4 to be less likely to move or separate from the support assembly 2, and further relieving the vertical impact force transmitted to the roll 4 and the electrode plates 3.

Further referring to FIG. 6, in the embodiment shown in the figure, only the clamp 22 is provided with the second buffer pad 24. It should be understood by those skilled in the art that the figure shows only an example, both of the clamp 22 and the support portion 21 may also be provided with buffer pads, or only the support portion 21 is provided with a buffer pad.

Further referring to FIG. 6, a baffle 211 is also arranged on the support portion 21 on one side of the accommodating space 23 and is configured to limit the roll 4 to prevent the roll 4 from moving in the X-axis direction, further reducing the risk of misalignment of the electrode plates 3.

In some embodiments, the materials of the first buffer pad and the second buffer pad include rubber, polyethylene or silicone. Rubber, polyethylene or silicone is chosen to prepare the first buffer pad and/or the second buffer pad, so that the first buffer pad and/or the second buffer pad can have an excellent buffering effect and can be durable.

In some embodiments, the first buffer pad and/or the second buffer pad have/has a thickness ranging from 4 mm to 20 mm.

"Thickness" refers to a dimension in the Z-axis direction.

The inventor found through experiments that in the case where the first buffer pad and/or the second buffer pad have/has the thickness of less than 4 mm, due to the relatively thin buffer pad(s), the roll 4 may not be in close contact with the support portion 21 or the clamp 22, resulting in a poor buffering effect. Therefore, in the embodiments of the present application, the first buffer pad and/or the second buffer pad have/has a thickness of greater than or equal to 4 mm. According to actual applications, the thickness of the first buffer pad and/or the second buffer pad should not be so large that the accommodating space 23 fails to accommodate the roll 4. Therefore, an upper limit of 20 mm is set for the thickness. For example, the thickness of the first buffer pad and/or the second buffer pad may be any value within the range of 4 mm to 20 mm, such as 4 mm, 10 mm, 16 mm or 20 mm.

The first buffer pad and/or the second buffer pad are/is shaped to adapt to the shapes of the support portion 21 and the clamp 22 at corresponding positions. For example, if the positions of the support portion 21 and the clamp 22 where the first buffer pad and the second buffer pad are arranged are arc-shaped, the first buffer pad and the second buffer pad are also arc-shaped.

The first buffer pad and/or the second buffer pad have/has a thickness ranging from 4 mm to 20 mm, which can achieve an excellent buffering effect and ensure that the accommodating space 23 is enough for the roll 4.

Further referring to FIG. 3 and FIG. 4, the fixing frame 52 includes an outer fixing frame 521 and an inner fixing frame 522, the damping member 51 is fixed to the inner fixing frame 522, the inner fixing frame 522 is removably connected to the outer fixing frame 521, and the outer fixing frame 521 is configured to be fixed to the base plate 11 of the transport apparatus.

The outer fixing frame 521 has an accommodating cavity, and the inner fixing frame 522 is arranged in the accommodating cavity and is removably connected to the outer fixing frame 521. The inner fixing frame 522 may be removably connected the outer fixing frame 521 by means of screwing, hinging or snap-fitting. The figure shows the screwed connection. Each of the inner fixing frame 522 and the outer fixing frame 521 is provided with a threaded hole, and a screw or bolt passes through the threaded holes to fix the inner fixing frame 522 to the outer fixing frame 521.

The fixing frame 52 is divided into the outer fixing frame 521 and the inner fixing frame 522, the damping member 51 is fixed to the inner fixing frame 522, the outer fixing frame 521 is fixed to the base plate 11 of the transport apparatus, and the inner fixing frame 522 is removably connected to the outer fixing frame 521, so that the damping member 51 can be disconnected from the base plate 11 of the transport apparatus after the inner fixing frame 522 is disassembled from the outer fixing frame 521, which facilitates replacement and maintenance of the damping member 51.

Figure 7:
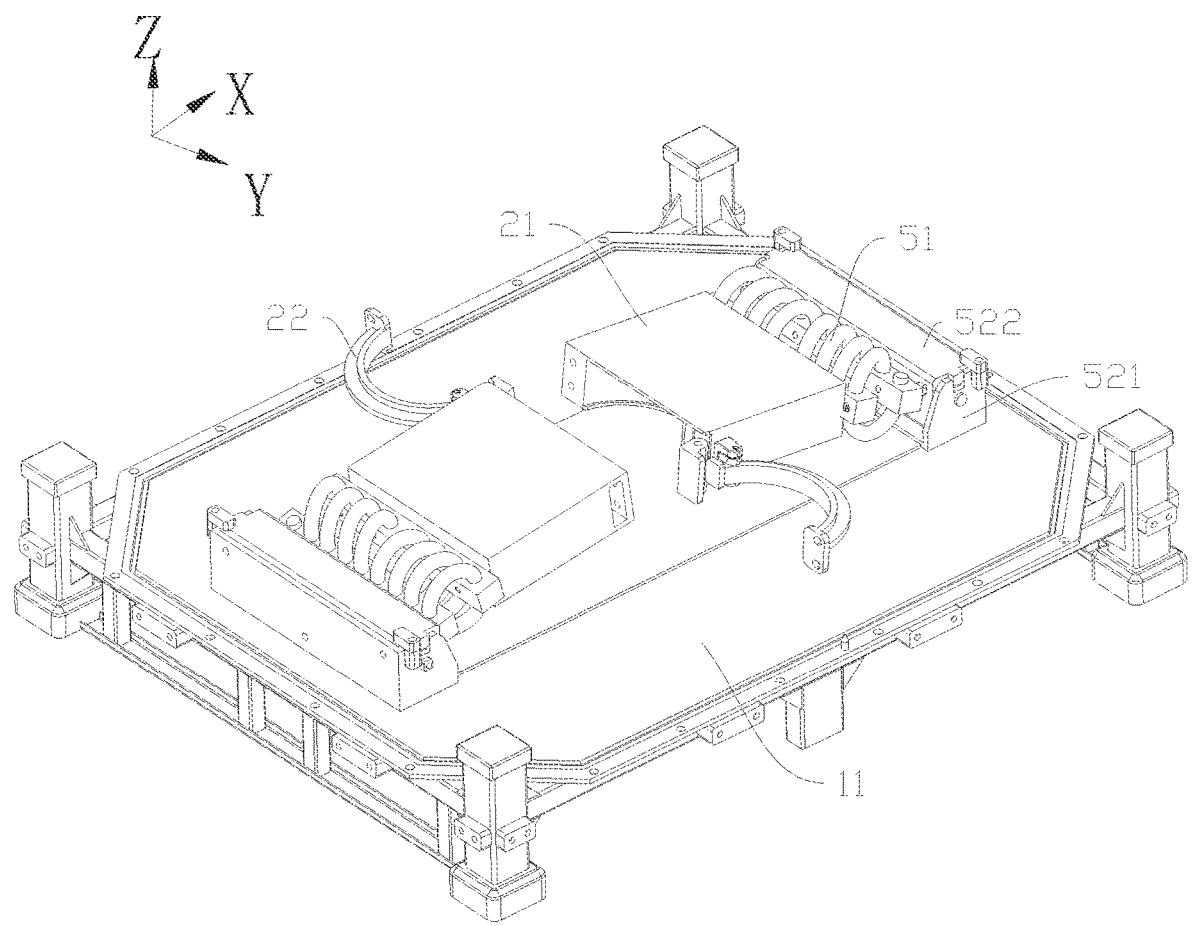
FIG. 7 is a schematic diagram of a state in which an inner fixing frame, a damping member and the support assembly rotate and then lay on the base plate of the transport apparatus.

Further referring to FIG. 2 and FIG. 4, the fixing frame 52 includes an outer fixing frame 521 and an inner fixing frame 522, the damping member 51 is fixed to the inner fixing frame 522, and the outer fixing frame 521 is fixed to the base plate 11 of the transport apparatus. The inner fixing frame 522 is rotatable relative to the outer fixing frame 521, and drives the damping member 51 and the support assembly 2 to rotate and then lay on the base plate 11. Referring to FIG. 7 for a laid state, FIG. 7 is a schematic diagram of a state in which the inner fixing frame, the damping member and the support assembly rotate and then lay on the base plate 11.

The inner fixing frame 522 rotates relative to the outer fixing frame 521, and the damping member 51 and the support assembly 2 fixed to the damping member 51 can rotate relative to the outer fixing frame 521 together with the inner fixing frame 522 and then lay on the base plate 11 of the transport apparatus. In this way, in the case where the roll 4 is not placed on the support assembly 2, the inner fixing frame 522, the damping member 51 and the support assembly 2 are as a whole changed from a vertical state before rotation to a horizontal placement state after rotation, which reduces the space occupied by the above components in the vertical direction, thereby saving their storage space.

With the folding design described above, a plurality of transport apparatuses are stacked up after the inner fixing frame 522, the damping member 51 and the support assembly 2 are laid down, which, compared with a state in which the inner fixing frame 522, the damping member 51 and the support assembly 2 are vertically placed, improves the utilization ratio of the storage space, and ensures that more above components can be placed in the storage space of the same size.

In the case where the inner fixing frame 522 is removably connected to the outer fixing frame 521, in order to make the inner fixing frame 522 rotate relative to the outer fixing frame 521, and drive the damping member 51 and the support assembly 2 to rotate and then lay on the base plate 11 of the transport apparatus, the inner fixing frame 522 needs to be disassembled from the outer fixing frame 521.

In some embodiments, a rotation limiter is also arranged between the inner fixing frame 522 and the outer fixing frame 521 for limiting the inner fixing frame 522 when the inner fixing frame 522 rotates relative to the outer fixing frame 521.

"Limiting" means that the inner fixing frame 522 is restricted from separating from the outer fixing frame 521. The rotation limiter is located between the inner fixing frame 522 and the outer fixing frame 521, a first portion of the rotation limiter is fixed to the outer fixing frame 521. the inner fixing frame 522 is provided with a limiting space (such as a limiting groove, a limiting cavity or a limiting hole), and a second portion of the rotation limiter is limited in the limiting space described above, so that the inner fixing frame 522 is not separated from the outer fixing frame 521 while rotating.

Alternatively, the first portion of the rotation limiter is fixed to the inner fixing frame 522, the outer fixing frame 521 is provided with a limiting space (such as a limiting groove, a limiting cavity or a limiting hole), and the second portion of the rotation limiter is limited in the limiting space described above, so that the inner fixing frame 522 is not separated from the outer fixing frame 521 while rotating.

The rotation limiter is arranged between the inner fixing frame 522 and the outer fixing frame 521, so that the inner fixing frame 522 is not separated from the outer fixing frame 521 during rotation in which the inner fixing frame 522, the damping member 51 and the support assembly 2 lay on the bottom of the base plate 11 as a whole, and the inner fixing frame 522 does not need to be repositioned when the inner fixing frame 522, the damping member 51 and the support assembly 2 are subsequently restored to the vertical state, which is convenient to operate.

Figure 8:
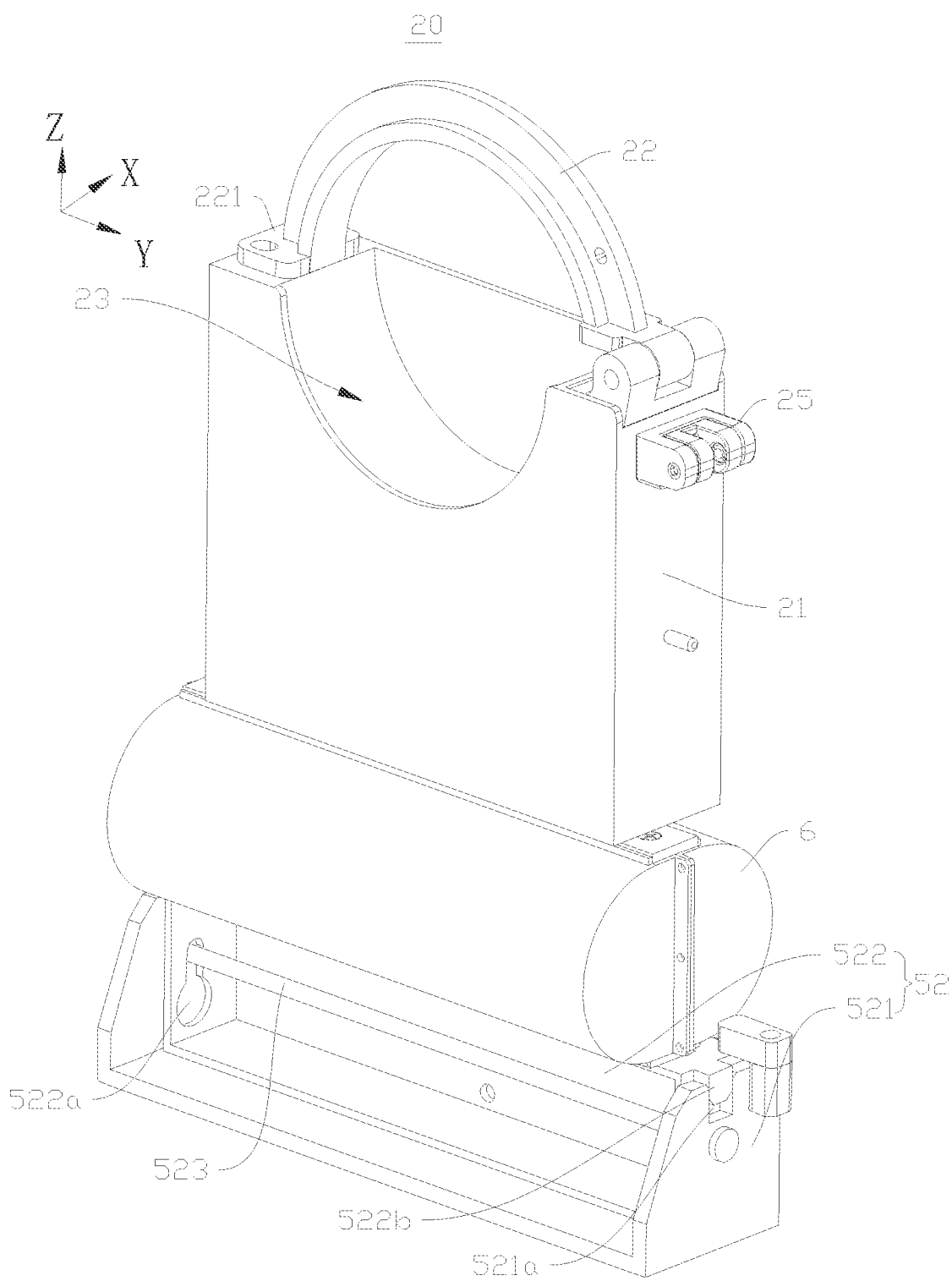
FIG. 8 is a schematic diagram of a partial cutaway structure of the support assembly and the damping assembly.

FIG. 8 is a schematic diagram of a partial cutaway structure of the support assembly and the damping assembly. Referring to FIG. 8, the rotation limiter includes a rotating shaft 523. The inner fixing frame 522 is provided with a through hole 522a. The rotating shaft 523 passes through the through hole 522a and is fixed to the outer fixing frame 521.

The inner fixing frame 522 is rotatable relative to the outer fixing frame 521 around the rotating shaft 523.

When the inner fixing frame 522 rotates relative to the outer fixing frame 521 around the rotating shaft 523, since the rotating shaft 523 passes through the through hole 522a in the inner fixing frame 522, the inner fixing frame 522 cannot be separated from the rotating shaft 523; and since the rotating shaft 523 is fixed to the outer fixing frame 521, the inner fixing frame 522 cannot be separated from the outer fixing frame 521, which facilitates the subsequent operation of restoring the inner fixing frame 522, the damping member 51 and the support assembly 2 to the vertical state.

Figure 9:
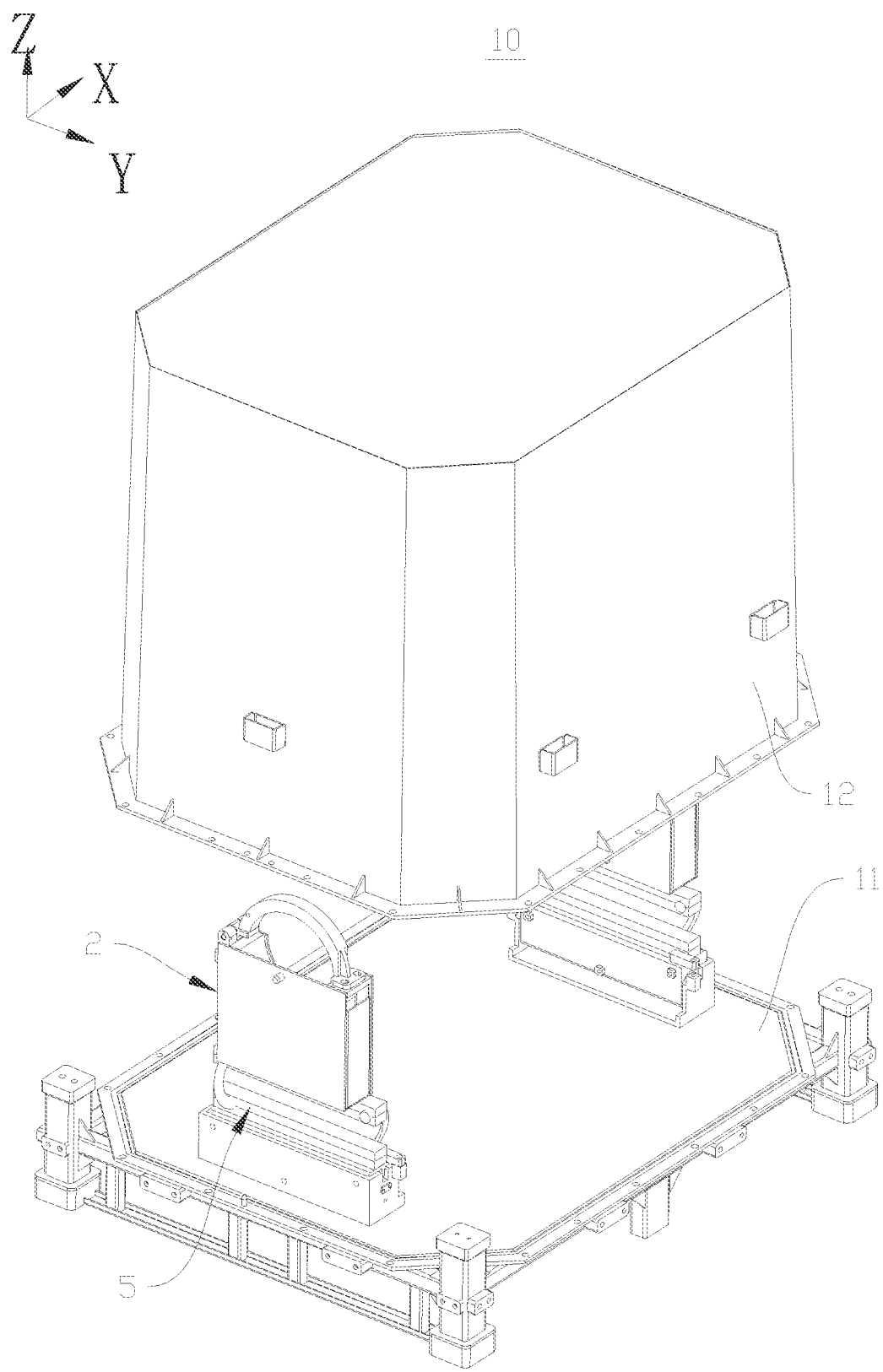
FIG. 9 is a schematic diagram of an exploded structure of a transport apparatus according to some embodiments of the present application.

Further referring to FIG. 9, the outer fixing frame 521 is provided with an engagement groove 521a, the inner fixing frame 522 is provided with an engagement block 522b, and the engagement block 522b is embedded into the engagement groove 521a. The engagement block 522b is removable from the engagement groove 521a when the inner fixing frame 522 is disassembled from the outer fixing frame 521.

In the embodiment shown in FIG. 8, an opening of the engagement groove 521a faces the positive Z-axis direction, and the engagement block 522b is embedded into the engagement groove 521a and removed from the engagement groove 521a in the Z-axis direction. Of course, the opening of the engagement groove 521a may also face the X-axis/Y-axis direction, and the engagement block 522b is embedded into the engagement groove 521a and removed from the engagement groove 521a in the X-axis/Y-axis direction.

The outer fixing frame 521 is provided with the engagement groove 521a, the inner fixing frame 522 is provided with the engagement block 522b, and the engagement block 522b is embedded into the engagement groove 521a, so that the assembly between the inner fixing frame 522 and the outer fixing frame 521 can be positioned to ensure the overall structural strength of the fixing frame 52. The engagement block 522b is in clearance fit with the engagement groove 521a, so that when the inner fixing frame 522 is disassembled from the outer fixing frame 521, the engagement block 522b can be removed from the engagement groove 521a without affecting the rotation of the inner fixing frame 522 relative to the outer fixing frame 521.

Further referring to FIG. 9, one end of the clamp 22 is rotatably connected to the support portion 21, and the other end of the clamp 22 is removably connected to the support portion 21.

One end of the clamp 22 may be rotatably connected to the support portion 21 by means of a rotating mechanism. For example, as shown in FIG. 8, the clamp 22 is provided with a rotating shaft, and a hole that matches with the rotating shaft is provided in the support portion 21 at the corresponding position. The rotating shaft rotates in the hole to drive the clamp 22 to rotate relative to the support portion 21. Conversely, for example, the support portion 21 is provided with a rotating shaft, and the clamp 22 is provided with a hole.

The other end of the clamp 22 may be removably connected to the support portion 21 by means of screwing, snap-fitting, etc. For example, as shown in FIG. 8, the clamp 22 is provided with a fixing plate 221 having a threaded hole (or through hole) provided therein, and a threaded hole is also provided in the support portion 21 at the corresponding position. A screw or bolt passes through the threaded hole (or through hole) in the clamp 22 and the threaded hole in the support portion 21 to fix the two. This end of the clamp 22 can be separated from the support portion 21 only by removing the screw or bolt during disassembly.

One end of the clamp 22 is rotatably connected to the support portion 21, and the other end of the clamp 22 is removably connected to the support portion 21, so that after the other end of the clamp 22 is disassembled, the clamp 22 can be rotated to provide an entrance for the roll 4 to be vertically placed downwards into the accommodating space 23 on the support assembly 2, which facilitates placement of the roll 4 and improves the packing efficiency of the electrode plates 3 before transportation. In addition, one end of the clamp 22 is rotationally connected to the support portion 21, and this end doe not need to be disassembled, which further improves the operation efficiency.

Further referring to FIG. 8, the support assembly 2 further includes a clamp holder 25 arranged on the support portion 21, and the clamp holder 25 is configured to hold the clamp 22 disassembled from the support portion 21.

The clamp holder 25 is arranged on a side wall of the support portion 21 perpendicular to a rotation plane of the clamp 22. The clamp holder 25 is provided with a clamp groove. The width of the clamp groove in the X-axis direction is slightly greater than or equal to the width of the clamp 22 in the X-axis direction, so that the clamp 22 can be snapped into the clamp groove after rotating and cannot move in the Z-axis direction.

The clamp holder 25 is provided to hold the clamp 22 disassembled from the support portion 21, preventing the movement of the disassembled clamp 22.

FIG. 9 is a schematic diagram of an exploded structure of a transport apparatus according to some embodiments of the present application. Referring to FIG. 9, an embodiment of the present application further provides a transport apparatus 10, including a protective apparatus 20 as described in the above embodiments. The protective apparatus 20 is arranged on the base plate 11 of the transport apparatus 10.

In the embodiments of the present application, during transportation of the electrode plates, an impact force on the transport apparatus 10 is transmitted from the base plate 11 of the transport apparatus 10 to the damping assembly 5, and the damping assembly 5 can absorb a part or even most of the impact force. In addition, the top of the damping assembly 5 is fixed to the bottom of the support assembly 2, and the bottom of the damping assembly 5 is fixed to the base plate 11 of the transport apparatus 10, that is, the damping assembly 5 is arranged inside the transport apparatus 10, so that the damping assembly 5 needs to damp vibration of only the support assembly 2, and the roll and the electrode plates that are supported by the support assembly 2, but not other components, reducing the damping weight of the damping assembly 5 and achieving a good damping effect. In this way, the impact force transmitted to the electrode plates is reduced, the risk of misalignment between layers of the electrode plates caused by a large impact force is reduced, the risk of scrapping of the electrode plates is reduced, and the yield of the electrode plates is improved.

Reference may be made to the embodiments shown in FIGS. 2 to 8 for the specific structure of the protective apparatus 20, which will not be repeated herein.

Referring to FIG. 9, the transport apparatus 10 further includes an outer cover 12. The outer cover 12 covers the base plate 11. The outer cover 12 covers the base plate 11 to form an accommodating space, and the damping assembly 5, the support assembly 2, the roll 4 and the electrode plates 3 are accommodated in the accommodating space. The fixing frame 52 in the damping assembly 5 is fixed to the base plate 11. The outer cover 12 may be fixed to the base plate 11 by means of welding, riveting, screwing, etc.

A sealed accommodating space may be formed between the outer cover 12 and the base plate 11, so as to achieve a dust-proof effect and protect the protective apparatus and the electrode plates accommodated therein.

The outer cover 12 shown in FIG. 9 is of a cuboid structure. It should be understood by those skilled in the art that the figure shows only an example, and in other embodiments, the outer cover 12 may also be in other shapes, such as a cube, a cylinder and a frustum, as long as the shape is suitable for accommodating the electrode plates 3.

Also referring to FIG. 8, the transport apparatus 10 further includes a dust cover 6. The dust cover 6 covers the damping member.

The damping effect of the damping member may be affected if dust or other impurities in the environment enter(s) the damping member. The dust cover 6 covering the damping member is provided to prevent dust or other impurities from entering the damping member, so that the damping effect of the damping member cannot be affected by dust and other impurities, which ensures the damping performance of the damping member.

For the convenience of assembly, the dust cover 6 may include a first cover body and a second cover body. After each of the first cover body and the second cover body covers the damping member, the joint of the two is locked and fixed, so as to realize the assembly of the dust cover 6 outside the damping member.

Further referring to FIG. 3, the transport apparatus 10 further includes a roll 4. The roll 4 is placed on the support assembly 2 after the electrode plates 3 are wound around the roll. The material of the roll 4 includes metal.

The metal may be steel, aluminum, iron, etc.

Generally, the material of the roll is ABS plastic (having a coefficient of thermal expansion of $78.3*10-6/K$), PC plastic (having a coefficient of thermal expansion of $70.2*10-6/K$), etc. The coefficient of thermal expansion of the metal is 50% to 80% smaller than that of ABS or PC (for example, aluminum has a coefficient of thermal expansion of $23*10-6/K$ and iron has a coefficient of thermal expansion of $12*10-6/K$). Under the same temperature change, self-deformation of the roll of metal is much smaller than that of the roll of ABS and PC. Therefore, the roll 4 is made of metal, so that the roll 4 is less likely to shrink and expand due to the temperature change during transportation of the electrode plates 3. If the roll 4 shrinks, it will easily lead to a gap between the roll 4 and the electrode plates 3, and a gap between layers of the electrode plates 3, resulting in smaller friction between the roll 4 and the electrode plates 3 and between the layers of the electrode plates 3. Therefore, the metal roll 4 can reduce the risk of misalignment of the electrode plates 3 caused by an external impact force greater than friction between the roll 4 and the electrode plates 3 and between layers of the electrode plates 3.

In some embodiments, the roll 4 has a diameter of ≥300 mm.

The diameter of the roll 4 is ≥300 mm, so that the total pressure on the surface of the electrode plate 3 is increased, and the tension of the electrode plate 3 is increased during winding of the electrode plates 3, thereby increasing the friction between the layers of the electrode plates 3 and reducing the risk of misalignment of the electrode plates 3.

Finally, it should be noted that the above embodiments are merely used for illustrating rather than limiting the technical solutions of the present application. Although the present application has been illustrated in detail with reference to the foregoing embodiments, it should be understood by those of ordinary skill in the art that the technical solutions described in the foregoing embodiments may still be modified, or some or all of the technical features thereof may be equivalently substituted; and such modifications or substitutions do not make the essence of the corresponding technical solution depart from the scope of the technical solutions of the embodiments of the present application, and should fall within the scope of the claims and the description of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. A protective apparatus for protecting electrode plates, the protective apparatus comprising:
   a support assembly, the support assembly being configured to support a roll around which the electrode plates are wound; and
   a damping assembly, a top of the damping assembly being fixed to a bottom of the support assembly, and a bottom of the damping assembly being configured to be fixed to a base plate of a transport apparatus;
   wherein:
   the damping assembly comprises a damping member and a fixing frame, the damping member comprises a first fixing portion, a second fixing portion, and an omnidirectional damping spring, a top of the damping member is fixed to the bottom of the support assembly, a bottom of the damping member is fixed to a top of the fixing frame, and a bottom of the fixing frame is fixed to the base plate of the transport apparatus; and
   a plurality of fixing holes are provided in each of the first fixing portion and the second fixing portion, and the omnidirectional damping spring runs through the plurality of fixing holes of the first fixing portion and the second fixing portion, to cause the omnidirectional damping spring to be fixed between the first fixing portion and the second fixing portion.

2. The protective apparatus according to claim 1, wherein:
   the first fixing portion is fixed to the support assembly, and the second fixing portion is fixed to the fixing frame.

3. The protective apparatus according to claim 1, wherein the fixing frame comprises an outer fixing frame and an inner fixing frame, the damping member is fixed to the inner fixing frame, the inner fixing frame is removably connected to the outer fixing frame, and the outer fixing frame is configured to be fixed to the base plate of the transport apparatus.

4. The protective apparatus according to claim 2, wherein:
   the outer fixing frame is provided with an engagement groove, the inner fixing frame is provided with an engagement block, and the engagement block is embedded in the engagement groove; and
   the engagement block is removable from the engagement groove when the inner fixing frame is disassembled from the outer fixing frame.

5. The protective apparatus according to claim 1, wherein:
   the fixing frame comprises an outer fixing frame and an inner fixing frame, the damping member is fixed to the inner fixing frame, and the outer fixing frame is configured to be fixed to the base plate of the transport apparatus; and the inner fixing frame is rotatable relative to the outer fixing frame, and drives the damping member and the support assembly to rotate and lay on the base plate.

6. The protective apparatus according to claim 5, wherein a rotation limiter is arranged between the inner fixing frame and the outer fixing frame for limiting the inner fixing frame when the inner fixing frame rotates relative to the outer fixing frame.

7. The protective apparatus according to claim 1, wherein the support assembly comprises a support portion, a clamp is arranged on the support portion, and an accommodating space for accommodating the roll is formed between the support portion and the clamp.

8. The protective apparatus according to claim 7, wherein in the accommodating space, the support portion is provided with a first buffer pad, and/or the clamp is provided with a second buffer pad.

9. The protective apparatus according to claim 8, wherein:
a material of the first buffer pad comprises rubber, polyethylene, or silicone; and/or
a material of the second buffer pad comprises rubber, polyethylene, or silicone.

10. The protective apparatus according to claim 8, wherein the first buffer pad and/or the second buffer pad has a thickness ranging from 4 mm to 20 mm.

11. The protective apparatus according to claim 7, wherein one end of the clamp is rotatably connected to the support portion, and another end of the clamp is removably connected to the support portion.

12. The protective apparatus according to claim 7, wherein the support assembly further comprises a clamp holder arranged on the support portion, the clamp holder being configured to hold the clamp removed from the support portion.

13. A transport apparatus, comprising:
the protective apparatus according to claim 1, the protective apparatus being arranged on the base plate of the transport apparatus.

14. The transport apparatus according to claim 13, further comprising:
a dust cover, the dust cover covering the damping member.

15. The transport apparatus according to claim 13, further comprising the roll, wherein:
the roll is placed on the support assembly after the electrode plates are wound around the roll; and
a material of the roll comprises metal.

16. The transport apparatus according to claim 15, wherein the roll has a diameter of ≥300 mm.

17. A protective apparatus for protecting electrode plates, the protective apparatus comprising:
a support assembly, the support assembly being configured to support a roll around which the electrode plates are wound; and
a damping assembly, a top of the damping assembly being fixed to a bottom of the support assembly, and a bottom of the damping assembly being configured to be fixed to a base plate of a transport apparatus;
wherein:
the damping assembly comprises a damping member, the damping member comprises a first fixing portion, a second fixing portion, and an omnidirectional damping spring;
a plurality of fixing holes are provided in each of the first fixing portion and the second fixing portion, and the omnidirectional damping spring runs through the plurality of fixing holes of the first fixing portion and the second fixing portion, to cause the omnidirectional damping spring to be fixed between the first fixing portion and the second fixing portion; and
the support assembly comprises a support portion, a clamp is arranged on the support portion, and an accommodating space for accommodating the roll is formed between the support portion and the clamp.

* * * * *